US012736351B2

(12) United States Patent
Holicki et al.

(10) Patent No.: US 12,736,351 B2
(45) Date of Patent: Sep. 15, 2026

(54) DETERMINATION OF AN ABSOLUTE INITIAL POSITION OF A VEHICLE

(71) Applicants: CARIAD SE, Wolfsburg (DE); Volkswagen Aktiengesellschaft, Wolfsburg (DE)

(72) Inventors: Michael Holicki, Berlin (DE); Ralph Hänsel, Berlin (DE); Timo Iken, Wolfsburg (DE); Roland Kube, Schwülper (DE); Carolin Last, Braunschweig (DE); Stefan Wappler, Berlin (DE)

(73) Assignees: CARIAD SE, Wolfsburg (DE); VOLKSWAGEN AG, Wolfsburg (DE)

( * ) Notice: Subject to any disclaimer, the term of this patent is extended or adjusted under 35 U.S.C. 154(b) by 512 days.

(21) Appl. No.: 17/899,361

(22) Filed: Aug. 30, 2022

(65) Prior Publication Data

US 2023/0079899 A1 Mar. 16, 2023

(30) Foreign Application Priority Data

Sep. 10, 2021 (DE) ..................... 10 2021 123 503.0

(51) Int. Cl.

| | |
|---|---|
| ***G01C 21/30*** | (2006.01) |
| ***G01C 21/16*** | (2006.01) |
| ***G01C 21/36*** | (2006.01) |

(52) U.S. Cl.

CPC ......... *G01C 21/30* (2013.01); *G01C 21/1656* (2020.08); *G01C 21/3602* (2013.01)

(58) Field of Classification Search

CPC ........................... G01C 21/30; G01C 21/1656; G01C 21/3602; G01C 21/16; G01C 21/36

See application file for complete search history.

(56) References Cited

U.S. PATENT DOCUMENTS

| | | | |
|---|---|---|---|
| 8,301,374 | B2 | 10/2012 | Surampudi et al. |
| 9,488,483 | B2 | 11/2016 | Ranganathan et al. |

(Continued)

FOREIGN PATENT DOCUMENTS

| | | | |
|---|---|---|---|
| DE | 102012208974 | A1 | 12/2012 |
| DE | 102012014397 | A1 | 1/2014 |

(Continued)

OTHER PUBLICATIONS

Nister et al., "A Minimal Solution to the Generalised 3-Point Pose Problem," Journal of Mathematical Imaging and Vision, 27 (1): 67-79, Jan. 2007 (Year: 2007).*

Espacenet Machine Translation of DE 102014006444, Hauies (Year: 2014).*

Espacenet Machine Translation of DE 102017215586, Dorenkamp (Year: 2019).*

(Continued)

*Primary Examiner* — Kito R Robinson

*Assistant Examiner* — Zachary E. F. Glade

(74) *Attorney, Agent, or Firm* — Seed Intellectual Property Law Group LLP

(57) ABSTRACT

To determine an absolute position of a vehicle, the vehicle is moved along a trajectory starting from the absolute initial position. The trajectory is sensed by odometry starting from a defined initial position, which is associated with the absolute initial position. Three objects are detected from the vehicle which is on the trajectory. At each detection, a detection beam is sensed. The trajectory with the detection beams are matched with a map. Finally, the absolute initial position is determined from the matching.

19 Claims, 3 Drawing Sheets

(56) References Cited

U.S. PATENT DOCUMENTS

| | | | | |
|---|---|---|---|---|
| 10,215,571 | B2 | 2/2019 | Ghadiok et al. | |
| 10,430,968 | B2 | 10/2019 | Houts et al. | |
| 10,467,771 | B2 | 11/2019 | Stenborg | |
| 2015/0142248 | A1* | 5/2015 | Han | G01C 21/3602 701/23 |
| 2023/0204364 | A1* | 6/2023 | Nachstedt | G01S 19/485 701/445 |

FOREIGN PATENT DOCUMENTS

| | | | | |
|---|---|---|---|---|
| DE | 102014006444 | A1 * | 10/2014 | G01S 19/47 |
| DE | 102007021762 | B4 * | 2/2019 | G01S 17/931 |
| DE | 102017215586 | A1 * | 3/2019 | G01S 17/931 |
| EP | 3644015 | A1 * | 4/2020 | G06T 7/74 |
| WO | WO-2014020320 | A1 * | 2/2014 | G06T 7/0008 |
| WO | WO 2016130719 | A1 | 8/2016 | |

OTHER PUBLICATIONS

Espacenet Machine Translation of DE 102007021762, Takagi (Year: 2019).*

Camposeco et al., “Minimal Solvers for Generalized Pose and Scale Estimation from Two Rays and One Point”, ECCV, Part V, pp. 202-218, 2016.

Grossberg et al., “The Raxel Imaging Model and Ray Based Calibration”, International Journal of Computer Vision, 61(2): 119-137, 2005.

Nishimura et al., “A linear Generalized Camera Calibration from Three Intersecting Reference Planes”, ICCV, pp. 2354-2362, 2015.

Nistér et al., “A Minimal Solution to the generalised 3-Point Pose Problem”, Journal of Mathematical Imaging and Vision, 27(1): 67-79, Jan. 2007.

* cited by examiner

DETERMINATION OF AN ABSOLUTE INITIAL POSITION OF A VEHICLE

BACKGROUND

Technical Field

Embodiments of the present invention relate to a method for determining an absolute initial position of a vehicle. Furthermore, embodiments of the present invention relate to a corresponding device with which the absolute initial position of the vehicle can be determined. Furthermore, embodiments of the present invention relate to a corresponding vehicle.

Description of the Related Art

For the navigation of vehicles, it is important that the current position of the vehicle is known. In particular, knowledge of the current position is essential for autonomous or semi-autonomous vehicles. The absolute current position can at least roughly be determined by global positioning systems. For autonomous driving, however, such rough positioning is often not sufficient. Moreover, global positioning systems are usually not available in parking garages. Therefore, it is necessary to resort to camera-based or other types of relative localizations in such situations.

Many methods for camera-based localization of a vehicle based upon landmarks firstly require an initial position and orientation of the vehicle, this in order to perform tracking with an improvement of the estimation of the current position in the further image sequence. Landmarks, the detection of which can be unambiguously identified with objects of a map, are an aid for this. An example of this are so-called AR markers (augmented reality) but can also be other unambiguous objects such as the numbers of parking bays. The general goal is to identify a number of such objects and to compute an initial pose or position by matching them with the map.

For global localization based on landmarks, there are various methods used in the art. One such well-known method is based on AR markers. From the detection of the four corners of the AR marker in the image and the matching thereof with the four corners of the same marker in the 3D map, an initial pose can be determined using a classical PnP (Perspective-n-Point) method. This is done, for example, in the publicly available OpenCV Aruco Library. These methods are relatively inaccurate, especially for markers that are distant from one another, and require not only knowledge of the position of the marker in the 3D map, but also its exact orientation and dimensions. They are not suitable for objects where precise contours cannot be extracted.

The aforementioned PnP method is based on an n-point pose computation problem, according to which the pose of a calibrated camera is to be estimated from a set of "n" 3D points in the world and their corresponding 2D projections in the image. The camera position usually has 6 degrees of freedom, composed of the three rotations and the three translations of the camera with respect to the world. For the classical PnP method, a plurality of (at least 3) objects are extracted in a single camera image and matched with the map. From this, the pose can then be determined. The disadvantage herein is that three objects must be visible at the same time, which represents a major restriction to the geometry of the landmarks. This method can moreover also not be generalized for use with multi-camera systems (such as surround-view systems) since the visual beams of the detections must meet in one point.

Such a P3P method is described, for example, by David Nistér & Henrik Stewénius, (2007) in "A Minimal Solution to the generalised 3-Point Pose Problem," Journal of Mathematical Imaging and Vision; 27; pages 67 to 79.

A so-called generalized PnP method is described in: Camposeco et al., "Minimal Solvers for Generalized Pose and Scale Estimation from Two Rays and One Point," ECCV 2016. In this generalized PnP method, the visual beams do not intersect.

Accordingly, in Nishimura et al., "A linear Generalized Camera Calibration from Three Intersecting Reference Planes," ICCV 2015, a so-called "generalized camera" is presented in which non-intersecting visual beams are also generated. The concept for this was already introduced by Nayar Grossberg in "The Raxel Imaging Model and Ray Based Calibration," International Journal of Computer Vision 61(2) 2005.

Another approach to localization, based on landmarks, is to travel a certain distance with the vehicle while performing a 3D reconstruction of the extracted objects in the vehicle coordinate system. The resulting 3D map can be compared with the external map using a 3D-3D-matching process to determine the position of the vehicle. The disadvantage in this is that this requires a 3D reconstruction with sufficient accuracy, which in turn requires that the objects be tracked over a longer period of time. In particular, single detections of objects cannot be used.

A method for localization and mapping is known from US 10 21 55 71 B2, which method comprises recording an image with a camera attached to a vehicle. A global position system location is assigned to the vehicle. A landmark depicted in the image is identified using a landmark identification module of the vehicle. The identified landmark has a geographic location and a known parameter. A feature extraction module is used to extract a set of landmark parameters from the image. A relative position of the vehicle to the geographic location of the landmark is determined based on a comparison between the extracted set of landmark parameters and the known parameter. The global position system location is updated based on the relative position.

U.S. Pat. No. 9,488,483 B2 furthermore discloses a system for creating a classification template for road markers and for vehicle location based on such road markers. A template database for classification of road marking includes templates of training images obtained from various navigation environments. A training image containing a road marking can be rectified and enhanced. On the basis of the rectified or enhanced image, the outline of the road marking can be calculated. Positions can be determined for the outline and be saved as part of a template. In addition, the outline for a run-time image can be calculated and matched with the outlines of templates from the template database. Based on the matching, the location or position of a vehicle can be determined. In this way, vehicle localization is enabled in which drift or other problems of GPS (for example, occlusion) are mitigated.

BRIEF SUMMARY

Some embodiments enable a reliable determination of an initial position of a vehicle. A method for determining an absolute initial position of a vehicle is provided in some embodiments. The initial position is, for example, the position at the beginning of a trajectory or any movement of the vehicle and serves as the basis for calculating the position of the vehicle at other times.

For this purpose, the vehicle is initially moved from the absolute initial position along a trajectory. This means, for example, that the vehicle is driven a certain distance and this distance corresponds to the trajectory. The starting point of the route or alternatively trajectory is the absolute initial position. However, the vehicle or the user does not yet know this absolute initial position, in particular its coordinates. To determine this absolute initial position, the trajectory is sensed by relative navigation starting from a relative initial position. By way of example, the relative initial position is determined by setting its coordinates to 0 or to another predetermined value. The trajectory resulting from the movement of the vehicle is sensed by so-called relative navigation by means of suitable sensor technology, such as of the vehicle. The relative initial position is set as the starting point of the trajectory.

In a further step of the method described herein, the trajectory is sensed by odometry starting from a defined initial position, which is associated with the absolute initial position. Since the absolute initial position is not yet known, the starting point of the trajectory is defined as the initial position, for example by assigning the coordinates 0/0 to this initial position. The defined initial position can, in principle, contain any coordinates. The coordinates defined in this way form the defined initial position from whence the odometry can start. The movement of the vehicle is recorded by the odometry. The position and, if necessary, also the orientation of a mobile system can be estimated by the system itself by means of odometry. Finally, a trajectory can be obtained from this estimation, which starts at the defined initial position.

Thereinafter, (at least) three objects are detected from the vehicle that is found to be travelling along the trajectory, wherein a detection beam is sensed for each detection. The objects are detected in a contactless manner. In so doing, for example, images of the surroundings of the vehicle are obtained and predetermined objects are identified in the images. The detection directions of the detected objects are sensed, for example, in relation to the vehicle or alternatively the trajectory. This results in a detection beam for each detected object, which emanates from the current position of the vehicle (detection position), or alternatively the detection device on the trajectory, and points in the direction of the detected object. It is also possible that more than three objects can be detected and used for further evaluation with their respective detection beams. The at least three objects are sensed from at least two different positions of the trajectory. This results in at least some of the detection beams for the at least three objects intersecting. Furthermore, this means that the trajectory and in particular the detection beams are not all sensed at the same time. Rather, a virtual construct is created from the trajectory and the detection beams from the temporally staggered recordings or alternatively sensing of images.

Furthermore, the sensed trajectory including the sensed detection beams (virtual construct) is matched with a digital map in which the three objects are represented with their respective absolute positions in order to determine a position of the defined initial position relative to the objects. Since the absolute positions of the at least three objects are known from the digital map, and likewise the relative relationship between the objects and the defined initial position is also known, the absolute initial position can be associated with the defined initial position from this data. In this manner, the absolute initial position of the vehicle moving along the trajectory can be estimated.

In an embodiment of the method described herein, an associated orientation is obtained from the matching with the absolute initial position of the vehicle. For this purpose, the poses are, of course, also sensed during the sensing of the trajectory. Contemporaneously with the absolute initial position, the orientation of the vehicle in the initial position, which is to say the initial pose, can also be determined. This allows the absolute pose of the vehicle at the beginning of the trajectory to be obtained.

In corresponding embodiment examples, the odometry is an optical odometry, a radar odometry, or a wheel odometry. In optical odometry, the flow of objects in images is determined. Conclusions relating to the self-motion can be obtained from this flow of the objects. With a sufficient number of objects in the flow, the position and orientation of the vehicle can be estimated. Similarly, odometry can be based on radar instead of light. Here, too, the flow of objects in radar images can be monitored and the position and orientation of the vehicle inferred. Most common, however, is so-called wheel odometry, in which the position and orientation of the vehicle can be estimated using data from the propulsion system of the vehicle. For example, the revolutions of the wheels and the steering angles are taken into account for the estimation.

In one embodiment of the method for determining the absolute initial position of the vehicle, at least one of the objects is detected multiple times. If one of the at least three objects is detected multiple times, multiple detection beams are generated for the respective object. This increased number of detection beams increases the accuracy when determining the absolute initial position. If necessary, a point of intersection of detection beams with which a common object was detected can be used for matching with the digital map. In particular, apart from detection errors, the respective object should be located at the point of intersection. When matching, one can use appropriate optimization algorithms.

As already indicated above, the detection of the three objects can be accomplished by optical detection, radar detection and/or ultrasonic detection. The optical detection can occur using one or more cameras. The detection can be based on a corresponding image evaluation. The same applies to radar detection and ultrasound detection. Here, too, corresponding radar images or ultrasound images of the surroundings of the vehicle can be obtained in order to identify predetermined objects or object types by means of suitable image evaluation.

In an embodiment of the method described herein, the matching involves a generalized PnP method and, in particular, a generalized P3P method. The PnP (Perspective-n-Point) method is a problem for estimating the pose of a calibrated camera given a set of "n" 3D points in the world and their corresponding 2D projections in the image. The camera pose has six degrees of freedom concerning the different rotations and translations. The commonly known P3P method, which is available as open source software, can be used, in particular, for three objects, which is to say when "n"=3. With the "generalized PnP method," the detection beams or visual beams do not intersect, at least not all of them. The detection beams are recorded by several cameras of a multi-camera system ("generalized camera"). In the case in point, the detection beams are generally recorded one after the other from different locations on the trajectory, which is why we can speak of a "virtual generalized camera."

In a special embodiment of the method, it is provided that the detection beams and the trajectory are sensed in three-dimensional space. In this way, corresponding 3D information regarding the absolute initial position or initial pose can be obtained. In so doing, corresponding spatial information regarding the initial position or initial pose can be determined.

Specifically, a method can be provided for determining a current position of a vehicle by means of determination of an absolute initial position of the vehicle in the manner described above and for obtaining the current position by odometry and/or by camera-based localization starting from the initial position. The determined absolute initial position is therefore used here in the vehicle itself in order to, in particular, be able to determine the current position or current pose in absolute terms. A determination of this type of the current position or alternatively current pose of the vehicle is extremely important in the autonomous or semi-autonomous operation of vehicles. This method of determination of the current position or alternatively current pose of the vehicle can be particularly advantageous in parking garages, where it is often not possible to use other systems.

In some embodiments, the above-mentioned task is also solved by a device for determining an absolute initial position of a vehicle, comprising:

- a sensing means for sensing a trajectory by means of odometry starting from a defined initial position, wherein the sensing means is movable along the trajectory starting from the absolute initial position,
- a detection device for detecting three objects from the detection device that is located on the trajectory, wherein a detection beam is sensed at each detection,
- a matching means for matching the sensed trajectory including the sensed detection beams with a digital map in which the three objects with their respective absolute positions are represented for determination of a location of the defined initial position relative to the objects, and
- a determination means for determining the absolute initial position based on the location of the defined initial position relative to the objects.

Furthermore, in some embodiments, a vehicle with such a device for determining the absolute initial position or current position is also provided.

Some embodiments also include further developments of the device described herein or alternatively of the vehicle described herein which have features as they have already been described in connection with the further developments of the method described herein. For this reason, the corresponding further developments of the device described herein or alternatively of the vehicle described herein are not described again here.

Some embodiments also encompass combinations of the features of the described embodiments.

DETAILED DESCRIPTION

In the embodiments described herein, the components described each represent individual features of the embodiment which are to be considered independently of one another and which each also further develop the technology independently of one another and are thus also to be regarded as a component of the technology individually or in any combination other than that shown. Furthermore, the embodiments described herein can also be supplemented by more of the already described features described herein.

In the figures, functionally identical elements are each provided with the same reference signs.

The position and, if applicable, the orientation of a vehicle is to be estimated by extracting it, for example, from a camera image and matching it with a map of the surroundings. This estimated position (and optionally orientation) may be used to initialize a downstream landmark-based localization.

In the embodiment described below, three technologies are combined to enable initial localization of a camera-equipped vehicle using an external 3D map. The first technology is the extraction from the camera image of objects that can be unambiguously identified with objects from the map (for example, augmented reality markers). For the extraction of the objects, the type of these objects must be specified. The second technology to be combined with the first technology is a method for "relative navigation" (which is to say, odometry) of the vehicle over a route segment that is long enough to extract at least three different objects in the camera data (generally image data). In this context, relative navigation can be performed by vehicle odometry (which is to say, wheel odometry), by a camera-based method or optical odometry (for example, SLAM; Simultaneous Localization and Mapping), by wheel odometry, or by a combination thereof. As a third technology, a generalized method for solving a three-point pose problem (also known as "Perspective-3-Point" or more generally "Perspective-n-Point") is combined with the two technologies mentioned above, which enables the positioning of a generalized or alternatively generalized camera with at least three sightings of known objects or landmarks. Such a PnP method is described, by way of example, in the above-mentioned publication by Nistér et al.

In this combination of technologies, it is possible to view the entire recorded trajectory with its temporally different views as the product of a single "virtual generalized camera" and to use the "generalized PnP method" to perform localization.

Figure 1:
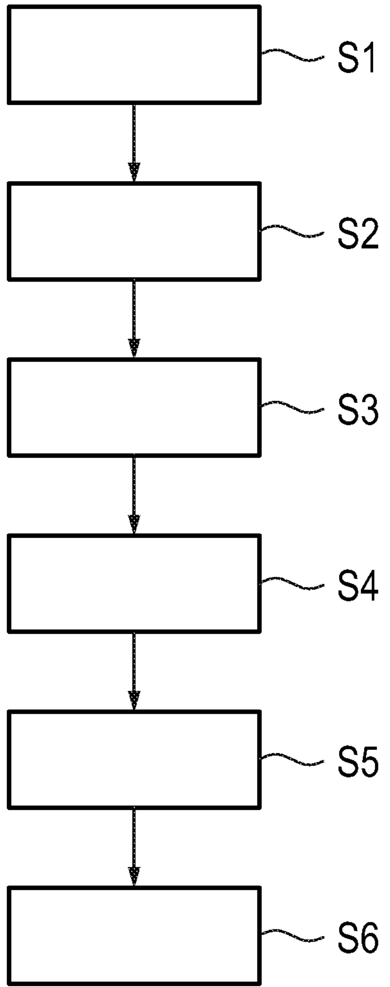
FIG. 1 shows a schematic block diagram of a method.

In FIG. 1, the individual steps of the procedure are shown schematically as a block diagram in order to determine the absolute initial position of a vehicle or alternatively its current position. In a first step, S1, the vehicle is moved along a trajectory 1 (compare FIG. 2), starting from the absolute initial position (the coordinates of which are not known at the outset). In a second method step, S2, which usually runs simultaneously with the first step, S1, the trajectory 1 is sensed by odometry starting from a defined initial position 2 or alternatively an initial pose. This defined initial pose or alternatively initial position 2 corresponds, for example, to the starting pose or alternatively starting position in the system of the vehicle as the start for the movement along the trajectory. The vehicle therefore moves and captures images of its surroundings, for example, with the camera (accumulation phase).

Subsequently, in a step, S3, at least three objects are detected from the vehicle, which vehicle is located on or moves along the trajectory. In so doing, upon each detection of an object (usually from different locations or points on the trajectory), a detection beam is sensed that has a start point (current position of the vehicle), a direction and, if necessary, an end point. Objects of a known type are therefore extracted from the images. The accumulation phase lasts until a sufficient number of "sightings" of a sufficient number of different objects are available.

Figure 2:
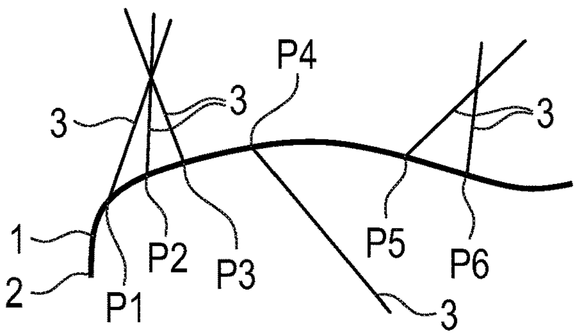
FIG. 2 shows a trajectory with detection beams.

In the example of FIG. 2, a first object is sighted at the points P1, P2 and P3 of trajectory 1. From each point P1 to P3, a respective visual or alternatively detection beam 3 is determined. Such a detection beam 3 is defined by its initial point P1, P2, P3 and possibly including the respective orientations with respect to the respective initial position 2 or alternatively the initial pose. Furthermore, the respective detection beams 3 are defined at least by their directions and, if applicable, also by endpoints.

Over the course of the trajectory, the vehicle arrives at a point P4, where it detects a second object with a detection beam 3. As it continues along the trajectory, the vehicle reaches points P5 and P6 on trajectory 2. From there, the vehicle detects a third object with respective detection beams 3. At all points of the trajectory at which a sighting or alternatively a detection of an object occurs, it may be that not only the position, but also the pose, of the vehicle is recorded.

Figure 3:
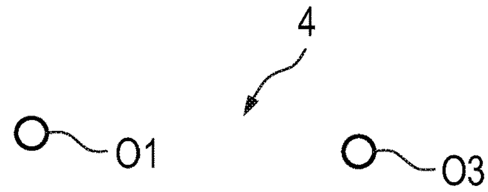
FIG. 3 shows objects in a digital map.
Figure 3:

FIG. 3 symbolically reproduces a digital map 4. Three objects O1, O2 and O3 are marked on the digital map. These objects O1 to O3 correspond to predefined object types that are detectable by the vehicle. In the example at hand, object O1 is detected or alternatively sighted by the vehicle at points P1 to P3. The second object O2 is detected only once at point P4 of trajectory 2. The object O3 is detected twice at the points P5 and P6 on trajectory 2.

In a further step, S4, the sensed trajectory 2 including the detection beams 3 is compared with the digital map 4. The digital map 4 contains the respective absolute positions of the objects O1 to O3. Of course, the digital map can also contain further objects and their absolute positions. The matching is performed according to the sketch of FIG. 4. This means that the trajectory 2 with its detection beams 3 is positioned and aligned according to FIG. 2 in such a way that the respective detection beams 3 correlate with the corresponding objects O1 to O3 (for example landmarks). In the example at hand, the detection beams 3 run through the objects O1 to O3. For the matching, an optimization method based, for example, on the smallest square error, can be used. Other so-called map matching methods can also be used for this purpose.

By means of relative navigation or alternatively the above-mentioned odometry methods, the pose of the vehicle can be located relative to the start of the trajectory, which is to say, the defined initial position 2. Each sighting corresponds to a visual beam or alternatively a detection beam, such as in three-dimensional space, wherein the detection beam 3 passes through the optical center of, for example, the camera, at the time of the sighting.

Figure 4:
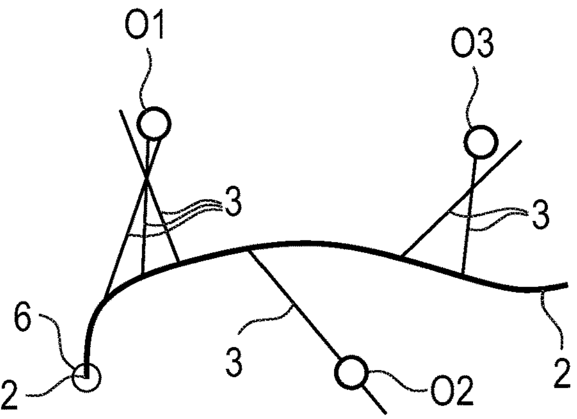
FIG. 4 shows a matching of the trajectory of FIG. 2 with the digital map of FIG. 3.

If an object is sighted several times, an averaged beam can be determined from the several sightings or alternatively detection beams 3. In the example of FIG. 4, by way of example, with respect to object O1, it is possible to average out a beam from three detection beams 3. A beam related to object O3 could be averaged from two detection beams 3, since object 3 was detected twice. By means of relative navigation or odometry, each detection beam 3 can, if necessary, be related to the trajectory in a 3D system. The result is a system of (3D-) detection beams 3 (without a common initial point) and associated 3D-points from the external or alternatively digital map 4. The relative vehicle trajectory can be recorded to the external map with the generalized PnP-method and thus the desired absolute initial pose or alternatively initial position of the vehicle can be determined (step S5).

Finally, in a further step S6, the current position of the vehicle can be determined on the basis of the absolute initial pose of the vehicle as determined above. The current position of the vehicle can be obtained starting from the initial position by odometry and/or camera-based localization.

Figure 5:
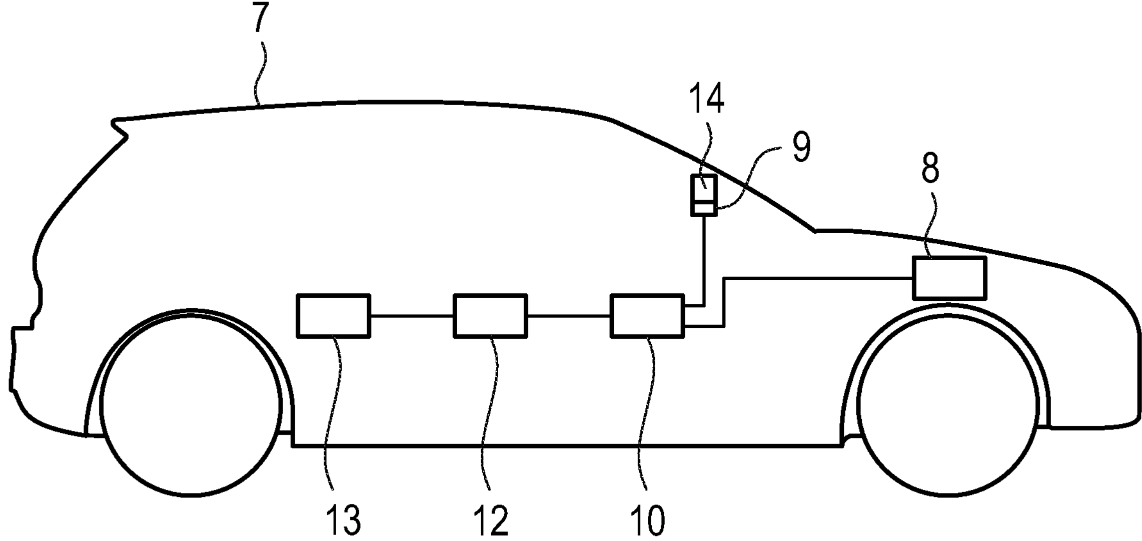
FIG. 5 shows a schematic representation of a vehicle with a device for determination of an initial position.

FIG. 5 schematically shows a vehicle 7 that is capable of determining an absolute initial position or alternatively an initial pose and, if necessary, also a current position using the method described above. For this purpose, the vehicle has an apparatus with the devices 8 to 13 described below. A sensing means 8 of the apparatus or alternatively of the vehicle 7 is used to sense the trajectory 1 by means of odometry starting from the defined initial position 2. The sensing means, or alternatively the apparatus, or alternatively the vehicle 7 is moved along the trajectory 1 starting from the absolute initial position.

In addition, the apparatus or alternatively the vehicle 7 has a detection device 9 for detection. The detection device 9, which is to say the device or alternatively the vehicle 7, is located on the trajectory. Upon each detection, a detection beam 3 is sensed. In FIG. 5, the detection device 9 is symbolized as a camera on the exterior mirror 14.

In addition, the apparatus or alternatively the vehicle 7 has a matching means 10 for matching the sensed trajectory 2, including the sensed detection beams 3, with a digital map 4 in which the three objects O1, O2, O3 are represented with their respective absolute positions, in order to determine a position of the defined initial position 2 relative to the objects O1, O2, O3.

Furthermore, the apparatus, or alternatively the vehicle 7, has a determination means 12 for determining the absolute initial position based on the position of the defined initial position relative to the objects. Finally, the apparatus, or alternatively the vehicle 7, also has a processing device 13 for determining an (up-to-date) current position or current pose of the vehicle based on the determined absolute initial position or alternatively initial pose and, if necessary, further odometry data or other detector data.

As shown in the above embodiment examples, a combination of relative navigation (odometry), object detection (landmark extraction) and triangulation or alternatively trilateration (for example, generalized PnP method) for estimating a vehicle pose is possible within the scope of the embodiments described herein. For this purpose, the objects detected during a trip at different times are, in particular, interpreted as objects of a single virtual generalized camera in initial pose or alternatively at the initial position.

In particular, a corresponding vehicle with a system of surround view cameras and vehicle odometry can be provided. Furthermore, a relative navigation by means of a SLAM method as well as a scale estimation via vehicle odometry is possible. Artificial reality markers can specifically be used as unambiguous landmarks.

Unambiguously assignable landmarks, such as numbers of parking bays, as well as also less unambiguous landmarks such as traffic signs can be used as objects or landmarks. The latter may require a downstream procedure to eliminate misassignments. Individual sightings of objects or alternatively of landmarks and sightings of the landmarks at different times can be used. Error-prone 3D reconstructions, on the other hand, are not necessary.

German patent application no. 10 2021123503.0, filed Sep. 10, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining an absolute initial position of a vehicle, comprising:

moving the vehicle, starting from the absolute initial position of the vehicle, along a trajectory, sensing the trajectory by odometry, starting from a defined initial position of the vehicle, wherein the defined initial position of the vehicle is assigned predetermined coordinates, and wherein each of the predetermined coordinates assigned to the defined initial position of the vehicle is zero, detecting three objects outside of the vehicle, from the vehicle located on the trajectory, wherein a plurality of detection beams is sensed for the three objects outside of the vehicle, wherein at least one of the three objects outside of the vehicle is detected from at least two different positions of the trajectory, and wherein at least some of the detection beams do not intersect, matching the trajectory, including the detection beams, with a digital map in which the three objects are represented with respective absolute positions of the three objects outside of the vehicle, to determine the defined initial position of the vehicle relative to the three objects outside of the vehicle, determining the absolute initial position of the vehicle based on the defined initial position of the vehicle relative to the three objects outside of the vehicle, and driving the vehicle autonomously based on the absolute initial position of the vehicle determined by the determining.

2. The method according to claim 1, wherein an associated orientation to the absolute initial position of the vehicle is also obtained from the matching.

3. The method according to claim 1, wherein the odometry is an optical odometry, a radar odometry or a wheel odometry.

4. The method according to claim 1, wherein at least one of the three objects outside of the vehicle is detected multiple times.

5. The method according to claim 1, wherein the detecting of the three objects outside of the vehicle is performed by optical detection, radar detection and/or ultrasonic detection.

6. The method according to claim 1, wherein the matching comprises a generalized Perspective-n-Point (PnP) method.

7. The method according to claim 1, wherein the matching comprises a generalized Perspective-Three-Point (P3P) method.

8. The method according to claim 1, wherein the detection beams are transformed into three-dimensional (3D) beams.

9. The method according to claim 1, wherein a point of intersection of the detection beams with which one of the three objects was detected is used for matching with the digital map.

10. The method according to claim 1, wherein one of the three objects outside of the vehicle is detected several times, and wherein an averaged beam is determined from the detection beams used to detect several times the one of the three objects outside of the vehicle.

11. A method for determining a current position of a vehicle, comprising:

determining an absolute initial position of the vehicle, including:

moving the vehicle, starting from the absolute initial position of the vehicle, along a trajectory, sensing the trajectory by odometry, starting from a defined initial position of the vehicle, wherein the defined initial position of the vehicle is assigned predetermined coordinates, and wherein each of the predetermined coordinates assigned to the defined initial position of the vehicle is zero, detecting three objects outside of the vehicle, from the vehicle located on the trajectory, wherein a plurality of detection beams is sensed for the three objects outside of the vehicle, wherein at least one of the three objects outside of the vehicle is detected from at least two different positions of the trajectory, and wherein at least some of the detection beams do not intersect, matching the trajectory, including the detection beams, with a digital map in which the three objects outside of the vehicle are represented with respective absolute positions of the three objects outside of the vehicle, to determine the defined initial position of the vehicle relative to the three objects outside of the vehicle, and determining the absolute initial position of the vehicle based on the defined initial position of the vehicle relative to the three objects outside of the vehicle;

obtaining the current position of the vehicle starting from the absolute initial position of the vehicle by odometry and/or by camera-based localization; and driving the vehicle autonomously based on the current position of the vehicle determined by the obtaining.

12. The method according to claim 11, wherein a point of intersection of the detection beams with which one of the three objects was detected is used for matching with the digital map.

13. The method according to claim 11, wherein one of the three objects outside of the vehicle is detected several times, and wherein an averaged beam is determined from the detection beams used to detect several times the one of the three objects outside of the vehicle.

14. An apparatus for determining an absolute initial position of a vehicle, comprising:

a sensor that, in operation, senses a trajectory by odometry starting from a defined initial position of the vehicle, wherein the sensor is movable along the trajectory starting from the absolute initial position, wherein the defined initial position of the vehicle is assigned predetermined coordinates, and wherein each of the predetermined coordinates assigned to the defined initial position of the vehicle is zero, a detection device that, in operation, detects three objects outside of the vehicle from the detection device located on the trajectory, wherein a plurality of detection beams is sensed for the three objects outside of the vehicle, wherein at least one of the three objects outside of the vehicle is detected from at least two different positions of the trajectory, and wherein at least some of the detection beams do not intersect, a matching system that, in operation, matches the trajectory including the detection beams with a digital map, wherein the three objects outside of the vehicle with respective absolute positions of the three objects outside of the vehicle are represented in the digital map, to determine the defined initial position of the vehicle relative to the three objects outside of the vehicle, and a determination system that, in operation, determines the absolute initial position of the vehicle from the detection beams by triangulation or trilateration based on the defined initial position of the vehicle relative to the three objects outside of the vehicle, wherein the vehicle is autonomously driven based on the absolute initial position of the vehicle determined by the determination system.

15. The apparatus according to claim 14, wherein a point of intersection of the detection beams with which one of the three objects was detected is used for matching with the digital map.

16. The apparatus according to claim 14, wherein one of the three objects outside of the vehicle is detected several times, and wherein an averaged beam is determined from the detection beams used to detect several times the one of the three objects outside of the vehicle.

17. A vehicle comprising:

a device that, in operation, determines an absolute initial position of the vehicle, the device comprising:

a sensor that, in operation, senses a trajectory by odometry starting from a defined initial position of the vehicle, wherein the sensor is movable along the trajectory starting from the absolute initial position, wherein the defined initial position of the vehicle is assigned predetermined coordinates, and wherein each of the predetermined coordinates assigned to the defined initial position of the vehicle is zero, a detection device that, in operation, detects three objects outside of the vehicle from the detection device located on the trajectory, wherein a plurality of detection beams is sensed at each detection, wherein at least one of the three objects outside of the vehicle is detected from at least two different positions of the trajectory, and wherein at least some of the detection beams do not intersect, a matching system that, in operation, matches the trajectory including the detection beams with a digital map, wherein the three objects outside of the vehicle with respective absolute positions of the three objects outside of the vehicle are represented in the digital map, to determine the defined initial position of the vehicle relative to the three objects outside of the vehicle, and a determination system that, in operation, determines the absolute initial position of the vehicle from the detection beams by triangulation or trilateration based on the defined initial position of the vehicle relative to the three objects outside of the vehicle, wherein the vehicle is autonomously driven based on the absolute initial position of the vehicle determined by the determination system.

18. The vehicle according to claim 17, wherein a point of intersection of the detection beams with which one of the three objects outside of the vehicle is detected is used for matching with the digital map.

19. The vehicle according to claim 17, wherein one of the three objects outside of the vehicle is detected several times, and wherein an averaged beam is determined from the detection beams used to detect several times the one of the three objects outside of the vehicle.

* * * * *